United States Patent [19]

Werz et al.

[11] Patent Number: 4,775,312

[45] Date of Patent: Oct. 4, 1988

[54] POWER PRESS FOR THE MANUFACTURE OF PROFILED BODIES

[75] Inventors: Jakaob F. Werz; Edmund Munk, both of Oberstenfeld, Fed. Rep. of Germany

[73] Assignee: Werzalit-Werke, J. F. Werz KG, Oberstenfeld, Fed. Rep. of Germany

[21] Appl. No.: 598,575

[22] Filed: Apr. 9, 1984

[30] Foreign Application Priority Data

Apr. 13, 1983 [DE] Fed. Rep. of Germany ..... 83103547

[51] Int. Cl.$^4$ ............................................... B28B 1/52
[52] U.S. Cl. .................................... 425/394; 249/205; 425/400; 425/412
[58] Field of Search ............... 425/408, 413, 422, 436, 425/438, 523, 577, 407, 543, 547, 412, 406, 468, 467, 555, 394, 398, 400; 264/230, 334, 342 R; 249/59, 67, 68, 83–85, 87, 205

[56] References Cited

U.S. PATENT DOCUMENTS

| | | |
|---|---|---|
| 461,777 | 10/1891 | Beyer et al. ........................ 425/812 |
| 3,049,784 | 8/1962 | Cullen ................................ 425/414 |
| 3,166,789 | 1/1965 | Schönenberger ................... 425/414 |
| 3,321,562 | 5/1967 | Wanderer .......................... 264/230 |
| 3,408,695 | 11/1968 | Scott ................................. 425/409 |
| 3,450,807 | 6/1969 | Cheney .............................. 425/196 |
| 3,673,295 | 6/1972 | Winchklhofer et al. ........... 264/230 |
| 3,807,913 | 4/1974 | Brede et al. ....................... 425/422 |
| 3,865,529 | 2/1975 | Guzzo ................................ 425/438 |
| 3,889,918 | 6/1975 | Stoebert ............................. 249/85 |
| 3,975,127 | 8/1976 | Munk et al. ....................... 425/407 |
| 3,997,643 | 12/1976 | Munk et al. ....................... 425/407 |
| 4,280,976 | 7/1981 | von Holdt ......................... 264/334 |
| 4,336,009 | 6/1982 | Wolf ................................. 264/276 |
| 4,343,754 | 8/1982 | Wilde et al. ....................... 264/230 |
| 4,399,092 | 8/1983 | Snow, Sr. et al. ................. 264/318 |
| 4,420,297 | 12/1983 | Remon .............................. 425/577 |
| 4,436,686 | 3/1984 | Drori ................................. 264/334 |
| 4,452,420 | 6/1984 | Lundquist ......................... 425/577 |

FOREIGN PATENT DOCUMENTS 58-53425 3/1983 Japan ................................ 425/555

Primary Examiner—Jan H. Silbaugh
Assistant Examiner—Jill L. Fortenberry
Attorney, Agent, or Firm—Michael J. Striker

[57] ABSTRACT

A power press for manufacturing profiled bodies from a thermohardening bonding agent mixed with fibrous materials and utilizing at least two hot pressing steps, including an inner pressing tool part having a first surface, an outer pressing tool part having a second surface and engaging the inner pressing tool part wherein the first and second surfaces of the inner and outer pressing tool parts are shaped to correspond to the shape of the profiled body to be pressed, and a holding arrangement for holding the profiled body to be pressed fixed during at least two of the hot pressing steps so that the power press acts at the same place on the profiled body to be pressed during each one of the hot pressing steps and thus prevents damage to the profile body to be pressed caused by shrinkage occurring during at least one of the hot pressing steps.

7 Claims, 2 Drawing Sheets

POWER PRESS FOR THE MANUFACTURE OF PROFILED BODIES

BACKGROUND OF THE INVENTION

The invention relates to a power press for the manufacture of profiled bodies. More particularly, it relates to a power press for the manufacture of stamped profiled bodies from a non-ascending mixture of a thermohardening bonding agent mixed with fibrous materials, which has at least an inner pressing tool part and an outer pressing tool part which engages the inner tool part and whose surfaces are profiled according to the profiled body to be pressed.

Power presses for the manufacture of profiled bodies of the above mentioned general type are known in the art.

One such power press is disclosed, for example, in the DE-PS No. 25 48 739. This power press is used to press profiled bodies such as outer and inner lining profiles for highrise constructions for lining balconies, table plates and the like, pressed from a non-ascending mixture with a thermohardening bonding agent mixed with fibrous materials.

The non-ascending mixture is composed mostly from ligno cellulose-containing fibrous materials, such as crushed and dried shavings, fibers of crushed sugar cane, etc, mixed with a thermohardening artifical or synthetic resin, such as melaminurea formaldehyde-or phenol formaldehyde resin. Instead of crushed and dried wood or fibers of crushed sugar cane, threads of another material, such as glassfibers, matte wood or asbestos fibers, either singularly or mixed together, can be used and to which corresponding preferably organic binding agents are added.

Usually the profiled bodies are manufactured in such a way that a rough pressed block is first made from the mixture by fold pressing, which can then be provided with a cover layer on its lower side, that is, on the outer surface of the profiled body which is not used as a visible side. For this purpose a rough pressed block which is already very similar to the completed profiled body is pressed from the mixture in a power press. Although during the preliminary pressing of the profiled body the amount of heat necessary for thermohardening of the binding has not been applied, the rough pressed block is already a firm body capable of being handled.

From the rough pressed block, by heat pressing in another power press the completed profiled body is produced.

During the hot pressing, the profiled body as a rule is simultaneously provided with a cover layer, which consists usually of at least one layer, namely, a decorative layer, for instance of a texture, a veneer, or print on paper foil or a plastic foil, over which a transparent protective layer can be arranged. As a protective layer, a so-called overlay-paper is used consisting of a non-filled alpha-cellulose paper on glass fiber fleece which is soaked with a Duroplast mostly on the melamin basis. The transparent protective layer can also be made in such a way that the decorative layer has a stronger resin layer. The known power press for manufacturing the aforementioned profiled bodies have proved to a large extent to be a success. Nevertheless, certain difficulties occur when the profiled body produced in this manner has a strongly structured upper surface or configuration.

In two stage power presses it is imperative that the pressing tool during the second hot pressing step act at the identically same place on the profiled body to be pressed as it did during the first hot pressing step. When this does not happen, then the profiled body to be pressed would appear damaged. If the pressing tool in the second hot pressing step acts at another place on the profile body to be pressed, it is responsible for the shrinkage of the profiled body occurring during the first heating process.

SUMMARY OF THE INVENTION

Accordingly, it is an object of the present invention to provide a power press for the manufacture of profiled bodies which avoids the disadvantages of the prior art.

More particularly it is an object of the present invention to provide a power press for the manufacture of profiled bodies in which the pressing tool during the second hot pressing step acts at the same place on the profiled body to be pressed as it did during the first hot pressing step, by providing a pressing work tool provided with at least one device for keeping the profiled body fixed during the hot pressings.

A power press is provided in which the hot pressing is carried out in two stages. By this two stage heating process, during the first hot pressing step the rough pressed block comes to almost its completed condition except it is without the cover layer pressed in. Thereafter, the power press once more opens, the top layer is inserted and the profiled body in the second hot pressing step is pressed to its finished condition and hardened.

In keeping with these objects, and with others which will become apparent hereinafter, one feature of the present invention resides, briefly stated, in a power press for manufacturing profiled bodies from a thermohardening bonding agent mixed with fibrous materials and utilizing at least two hot pressing steps including an inner pressing tool part having a first surface, an outer pressing tool part having a second surface and engaging the inner pressing tool part and the first and second surfaces of the inner and outer pressing tool parts are shaped to correspond to the shape of the profiled body to be pressed, wherein there is provided holding means for holding the profiled body to be pressed fixed during at least two of the heat pressing steps.

When the power press is designed in accordance with the present invention the power press acts at the same place on the profiled body to be pressed during each one of the hot pressing steps and thus prevents damage to the profile body to be pressed caused by shrinkage occurring during the preceding hot pressing step.

In accordance with another feature of the present invention, the holding means is a projection.

Still another feature of the present invention is that the projection juts up from the profiled surface of the inner pressing tool part.

A further feature of the present invention is that the projection extends uninterruptedly around the profiled surface of the inner pressing tool part.

Still yet another feature of the present invention is that the projection is arranged interruptedly on the profiled surface of the inner pressing tool part.

Yet still another feature of the present invention is that the holding means includes at least one elongated peg slidably displaceable within the inner pressing tool part and having an end capable of being pressed on to the profiled body.

Another feature of the present invention is that the longitudinal axis of the peg is inclined to the pressing direction of the inner and outer pressing tool parts.

Yet another feature of the present invention is that the end of the peg is pointed.

Another feature of the present invention is that the pointed end of the peg is slanted in only one direction.

Yet still another feature of the present invention is that the pointed end of the peg is slanted in two directions that converge at the point.

Still another feature of the present invention is that the longitudinal axis of the peg is perpendicular to the pressing direction of the inner and outer pressing tool parts.

Yet another feature of the present invention is that for a profiled body having at least one end, the holding means includes a tongue-like gripping appliance in which at least one of the ends of the profiled body is clamped therein.

Finally, still a further feature of the present invention is that the tongue-shaped gripping appliance includes at least two jaws having roughened surfaces.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
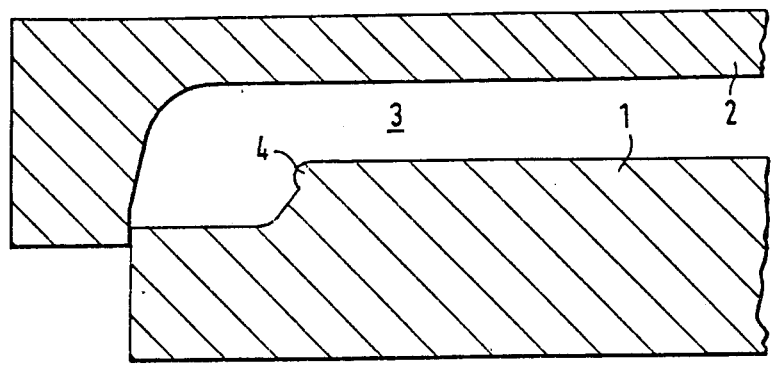
FIG. 1 is a cross-sectional view of the power press of the present invention with a locking device for the profiled bodies.

FIGS. 1 to 5 shown for the simplicity, from a complete power press of the present invention only an internal pressing tool part 1 and an external pressing tool part 2. The pressing tool parts 1 and 2 are provided with contours of the profiled body to be pressed. During hot pressing the profiled body to be pressed is located in a hollow space 3 between the pressing tool parts 1 and 2 which are shown in the position taken with the enclosed press. In the embodiment according to FIG. 1 there exists a locking device for the profiled body in the form of a projection 4.

The design of the hollow space 3 can correspond to the profiled body to be pressed, for instance a table plate. In this case the projection 4 is located on the internal pressing tool part 1 in a recess on the bottom surface of the edge of the table plate. The projection 4 can, when the internal pressing tool part 1 is provided for manufacturing a circular table plate, extends completely around the pressing tool part 1. The projection 4 can however be intermittent, for example located only at fixed places on the internal pressing tool 1, for instance in a point shaped arrangement.

Figure 2:
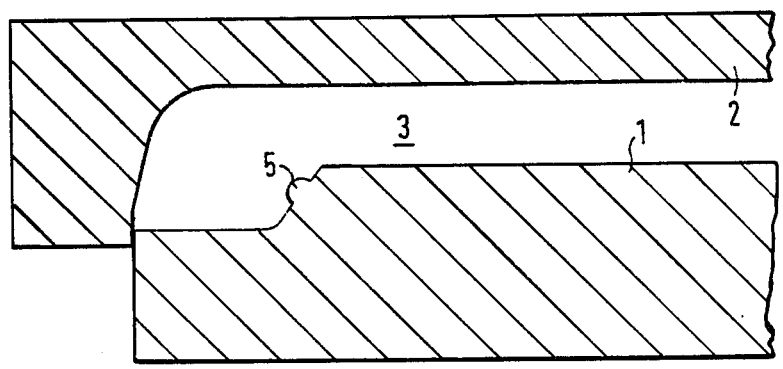
FIG. 2 is a cross-sectional view of the power press of the present invention according to FIG. 1, having another form of construction of the locking device.

In the embodiment of FIG. 2, which corresponds in essence to FIG. 1, a projection 5 is arranged at another place on the internal pressing tool part 1.

In both cases again the projections 4 and 5 assure that the profiled body to be pressed becomes locked on the internal pressing tool part and prevented from shrinking. The profile body can then to a certain degree become released from the internal pressing tool part, when the hot press process is finished.

The embodiments shown in the FIGS. 1 and 2 provide for usable results, when the profile body to be pressed has some elasticity.

Figure 3:
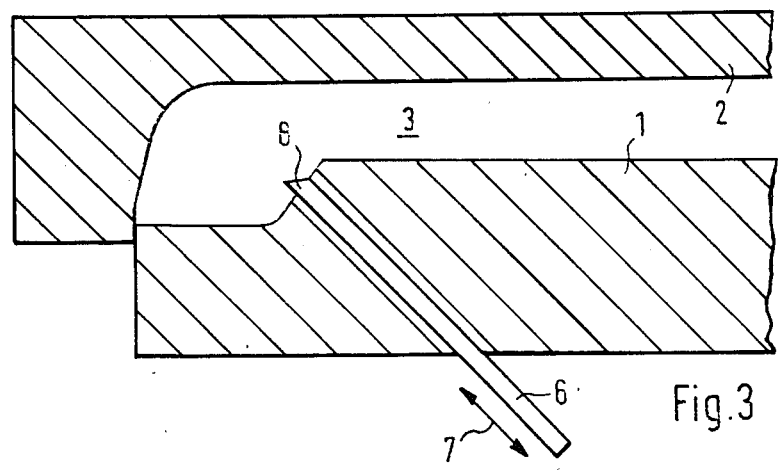
FIG. 3 is a cross-sectional view of the power press of the present invention according to FIG. 1, having still another form of construction of the locking device.
Figure 4:
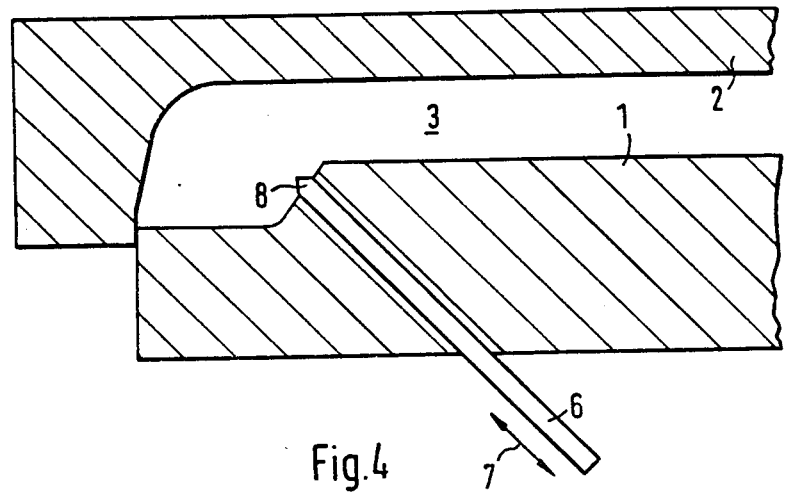
FIG. 4 is a cross-sectional view of the power press of the present invention according to FIG. 3, having a variation in the form of construction of the locking device.
Figure 5:
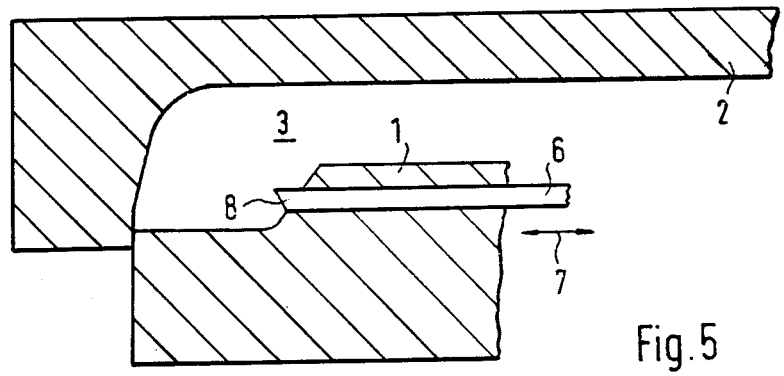
FIG. 5 is a cross-sectional view of the power press of the present invention according to FIG. 3, having another variation in the form of construction of the locking device.

When this is not the case, then the arrangements according to FIGS. 3 to 5 is used. In these arrangements there are in the internal tool part 1 a fixed number of pegs 6 are arranged movable in direction of arrows 7 so that their ends can become inserted into the profiled body to be pressed. In the exbodiment or FIG. 3, the end 8 of the peg 6 is constructed like a knife edge, while the end 8 of peg 6 of the embodiment of FIG. 4 is a pointed tip. The pegs are connected with a not shown drive which presses all peg in proper time prior to the opening of the power press after the first hot pressing step into the profile body and withdraws the pegs after the second hot press steps.

In the embodiment or FIGS. 3 and 4, the pegs 6 are arranged inclined in the internal pressing tool part 1 while the pegs 6 are arranged horizontally in the embodiment or FIG. 5.

The designs according to FIGS. 3 to 5 are particularly advantageous for automatically operating power presses, because with them it is possible to have a simple removal of the finished pressed profiled body.

Figure 6:
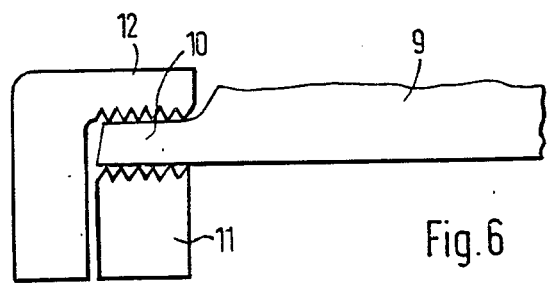
FIG. 6 is an elevational view of another form of construction of the locking device of the present invention for the profiled body.

FIG. 6 shows another locking device for the profiled body to be pressed, which is particularly suitable when a profiled body to be pressed is an elongated body, for instance a profiled coating. Such a profiled body can during the hot pressing on its edge 10, be clamped between a plier-like gripping device consisting of two jaws 11 and 12, whereby the edge can be for example in the employed profiled body not visible or detached after the pressing.

It will be understood that each of the elements described above, or two or more together, may also find a useful application in other types of power presses for the manufacture of profiled bodies differing from the types described above.

While the invention has been illustrated and described as embodied in a power press for the manufacture of profiled bodies, it is not intended to be limited to the details shown, since various modifications and structural changes may be made without departing in any way from the spirit of the present invention.

Without further analysis, the foregoing will so full reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A power press for hot pressing profiled bodies preliminarily shaped from a non-ascending mixture of a thermohardening bonding agent with fibrous materials, comprising:

an inner pressing tool part having a first surface;

an outer pressing tool part having a second surface and engaging said inner pressing tool part, said first and second surfaces of said inner and outer pressing tool parts being shaped to correspond to the shape of a profiled body to be pressed; said inner and outer pressing tool parts receiving a preliminarily shaped profiled body for two-stage hot pressing; and holding means provided in one of said pressing tool parts and holding the profiled body being pressed fixed during both stages of the two-stage hot pressing whereby a position of said preliminarily shaped profiled body after a first stage is not substantially changed to permit the press during a second stage of hot pressing to act on said profiled body exactly at the same place as that at said first stage, wherein said holding means includes at least one elongated peg slidably displaceable within said inner pressing tool part and having an end capable of being pressed onto the profiled body.

2. The power press as defined in claim 1, wherein the longitudinal axis of said peg is inclined to a pressing direction of said inner and outer pressing tool parts.

3. The power press as defined in claim 2, wherein said end of said peg has a pointed tip.

4. The power press as defined in claim 3, wherein said end of said peg is slanted in only one direction.

5. The power press as defined in claim 3, wherein said end of said peg is slanted in two directions that converge at said pointed tip.

6. The power press as defined in claim 1, wherein the longitudinal axis of said peg is perpendicular to a pressing direction of said inner and outer pressing tool parts.

7. The power press as defined in claim 6, wherein said end of said peg is slanted in only one direction.

* * * * *